United States Patent [19]

Missler

[11] Patent Number: 5,062,335
[45] Date of Patent: Nov. 5, 1991

[54] HORIZONTAL BAND-SAW

[76] Inventor: Patrick Missler, 12, rue de Tournehem, F-91450 Etiolles, France

[21] Appl. No.: 420,462

[22] Filed: Oct. 12, 1989

[30] Foreign Application Priority Data

Oct. 17, 1988 [FR] France .................... 88 13631

[51] Int. Cl.⁵ .................... B23D 55/02; B26D 1/46; B27B 13/02
[52] U.S. Cl. .................... 83/168; 83/639.005; 83/800; 83/820
[58] Field of Search .................. 83/101 X, 800 X, 794, 83/799, 801, 639.1, 639.5, 821, 783, 761, 762, 820, 168; 30/380

[56] References Cited

U.S. PATENT DOCUMENTS

| | | | |
|---|---|---|---|
| 2,898,669 | 8/1959 | Crane et al. | 29/68 |
| 3,182,538 | 5/1965 | Whitmore et al. | 83/800 X |
| 3,485,123 | 12/1969 | Komendowski | 83/168 |
| 4,487,097 | 12/1984 | Mara et al. | 83/801 X |
| 4,913,014 | 4/1990 | Missler | 83/800 X |

FOREIGN PATENT DOCUMENTS

| | | |
|---|---|---|
| 364560 | 3/1921 | Fed. Rep. of Germany . |
| 57-168824 | 10/1982 | Japan . |
| 513807 | 10/1939 | United Kingdom . |

Primary Examiner—Frank T. Yost
Assistant Examiner—Kenneth E. Peterson
Attorney, Agent, or Firm—Young & Thompson

[57] ABSTRACT

A band-saw for sawing metal parts such as bars has a work unit which is capable of displacement in the vertical direction above the workpiece support table. The work unit has two distinct lateral portions located on each side of two vertical guide sleeves and serving as supports for a vertical driving wheel and a vertical guide wheel of the saw-blades, the work run of which is placed horizontally above the location of the workpiece. Two vertical columns forming part of the moving unit are slidably mounted within the two vertical sleeves, the lower ends of which are fixed on the horizontal table. The ends of the vertical columns are rigidly fixed to two horizontal cross-members which are located respectively at the top and at the bottom and which connect together the two lateral portions of the moving work unit so as to form a closed frame.

5 Claims, 4 Drawing Sheets

HORIZONTAL BAND-SAW

BACKGROUND OF THE INVENTION

1. Field of the Invention

The present invention relates to band-saws which are intended to be employed for sawing metal parts such as bars or the like.

2. Description of the Prior Art

Machines of this type which correspond to the best current technique are the so-called "horizontal band-saws". In a typical machine, a work unit is capable of displacement in the vertical direction above the table which supports the workpiece to be sawn. This moving unit has two separate and distinct lateral portions which are located on each side of two vertical guiding members and serve as supports for two vertical saw-blade driving and guiding wheels. Since the saw-blade is an endless strip, it has two horizontal runs extending between said wheels, and one of these runs constitutes the work run of the saw-blade.

In current machines of this type, the vertical members for guiding the moving work unit consist of two columns, the lower end of each column being fixed on the work table. The frame of the moving work unit is fitted with sleeves which are slidably mounted on said columns. However, the two side portions of the moving unit are coupled together only at the top in order to leave a free space which is sufficient to permit engagement of the workpiece as said moving unit moves downwards.

This accordingly constitutes a serious drawback since the frame of the work unit is subjected to high compressive stresses in the horizontal direction, these stresses being produced by the high tension of the saw-blade (between 2 and 6 tons according to the cross-sectional area of the blade). These stresses therefore tend to cause deformation of the frame of the work unit and this deformation is sustained by the bearings of the vertical guiding columns.

In point of fact, the guiding columns are mounted "up in the air" since they are fixed on the corresponding table only at their lower ends. Moreover, the guiding zones of the moving work unit are located above the position of the work run of the saw-blade.

These disadvantages can be overcome only by providing a very rigid construction in order to guard against any danger of deformation of the moving work unit and of the vertical guiding columns, thus calling for extremely heavy parts and very accurate machining. This accordingly results in particularly high cost of machines of this type.

Furthermore, these machines are attended by a certain number of disadvantages which also result from their present design. These disadvantages are as follows:

a) In the event that provision is made for a single hydraulic jack for controlling the vertical displacements of the work unit, said jack must necessarily be displaced with respect to the axis of symmetry of said unit in order to ensure that the location provided for workpieces is left free. Such an arrangement is therefore unbalanced. As to the arrangement which consists in providing two control jacks placed on each side, this is clearly more costly.

b) It is necessary to carry out efficient lubrication of the bearings of the guiding columns in order to obtain good operation.

c) The guides of the clamping vise are placed in the swarf and cutting lubricant by reason of the fact that these guides are mounted on the receiving table located beneath the work run of the saw-blade.

d) By reason of the bulk of the moving unit which is located above the work run of the saw-blade, it is difficult to contemplate the addition of a vertical clamping system for cutting bundles of bars.

For the reasons given above, the present invention is directed to a horizontal band-saw which is of different design so as to permit a construction of much lighter weight and therefore less costly and to remove the various other disadvantages recalled in the foregoing.

SUMMARY OF THE INVENTION

To this end, the band-saw in accordance with the invention is essentially distinguished by the fact that:

the members for guiding its moving work unit consist of two vertical sleeves which are fixed on the horizontal work table at their lower ends and within which are slidably mounted two vertical columns forming part of the moving work unit, the ends of said vertical columns are rigidly fixed to two horizontal cross-members which are located respectively at the top and at the bottom and which connect together the two lateral portions of the moving work unit so as to form a closed frame.

Under these conditions, the above-mentioned frame can be designed in the form of a lightweight structure since it is capable of withstanding without deformation the high stresses produced by the tension of the saw-blade. For the same reason, the vertical guide sleeves and their fixing elements can be of much lighter design than in the prior art since they are no longer subjected to stresses transmitted by the frame of the moving work unit.

Moreover, in accordance with another distinctive feature of the band-saw in accordance with the invention, the upper ends of the vertical guide sleeves themselves are rigidly fixed by means of a stationary horizontal cross-member. This accordingly permits a very rigid construction.

In accordance with another distinctive feature of the band-saw under consideration, the cross-member thus provided between the upper ends of the vertical guide sleeves serves as a support for the guides of the upper ends of the jaws of the vise for clamping the workpiece whilst the lower ends of said jaws are free. This corresponds to reversal of the usual mode of assembly of jaws of this type. As a result of this reversal, the guides of the vise are no longer placed in the swarf and cutting lubricant.

In accordance with yet another distinctive feature of the band-saw considered, the arrangement is such that the horizontal top run of the saw-blade constitutes the work run of this latter whilst the horizontal return run is placed beneath the workpiece reception table. The advantage of this arrangement is that it is thus possible to lower the moving work unit, with the result that the guiding zones within the vertical sleeves are located approximately at the level of the work run of the saw-blade and not distinctly above this latter.

DETAILED DESCRIPTION OF THE INVENTION

Figure 1:
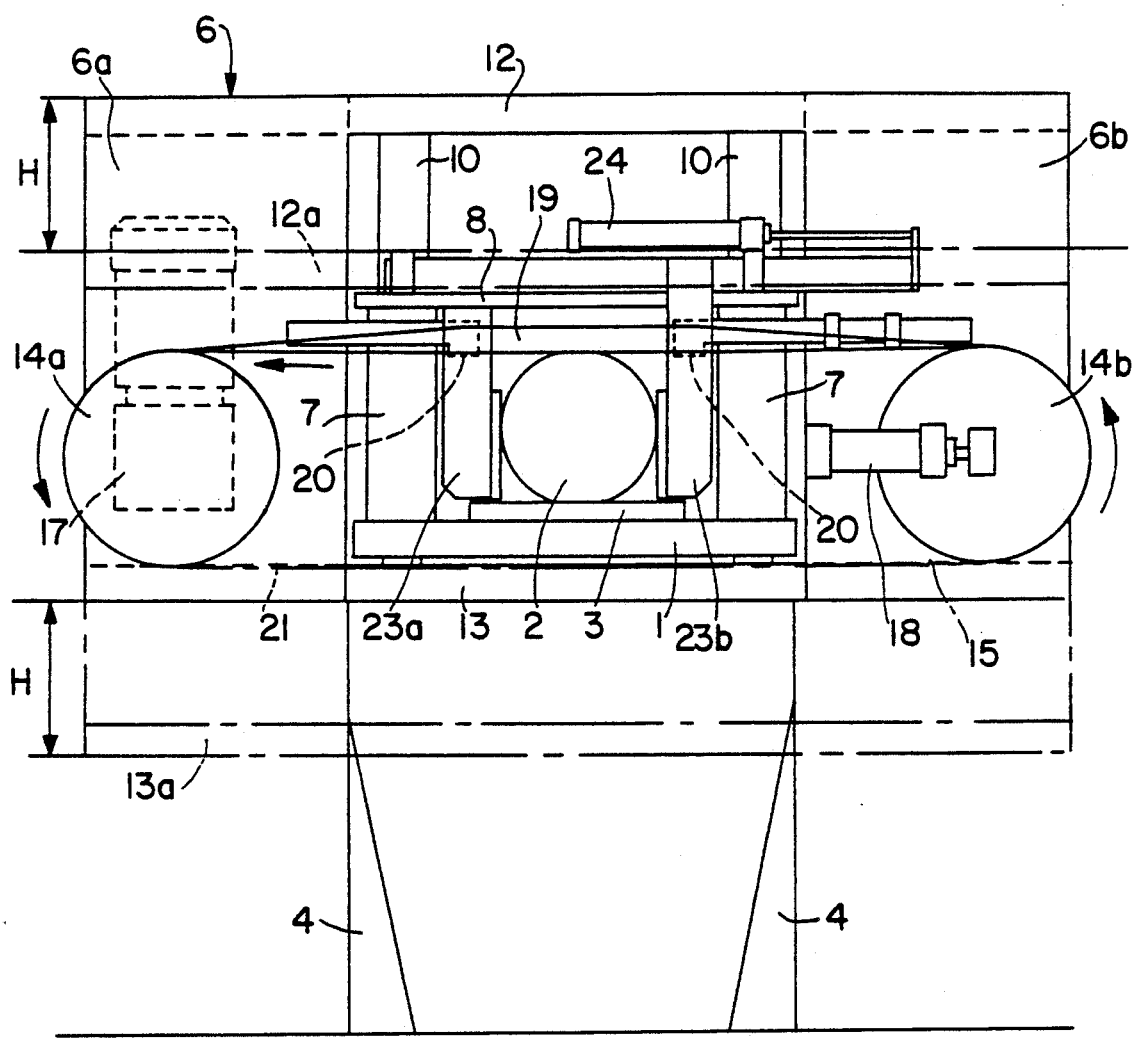
FIG. 1 is a view in front elevation of a band-saw in accordance with the invention.

The band-saw as illustrated has a stationary table 1 which is intended to receive the workpiece to be sawn such as, for example, a metal bar 2 placed on an intermediate sole-plate 3. The plate of said table is supported by legs 4 and projects beyond these latter at one end 5 so as to form an overhanging portion.

Above said projecting end, provision is made for a work unit which is designated by the general reference 6 and is mounted so as to be capable of displacement in the vertical direction.

Figure 4:
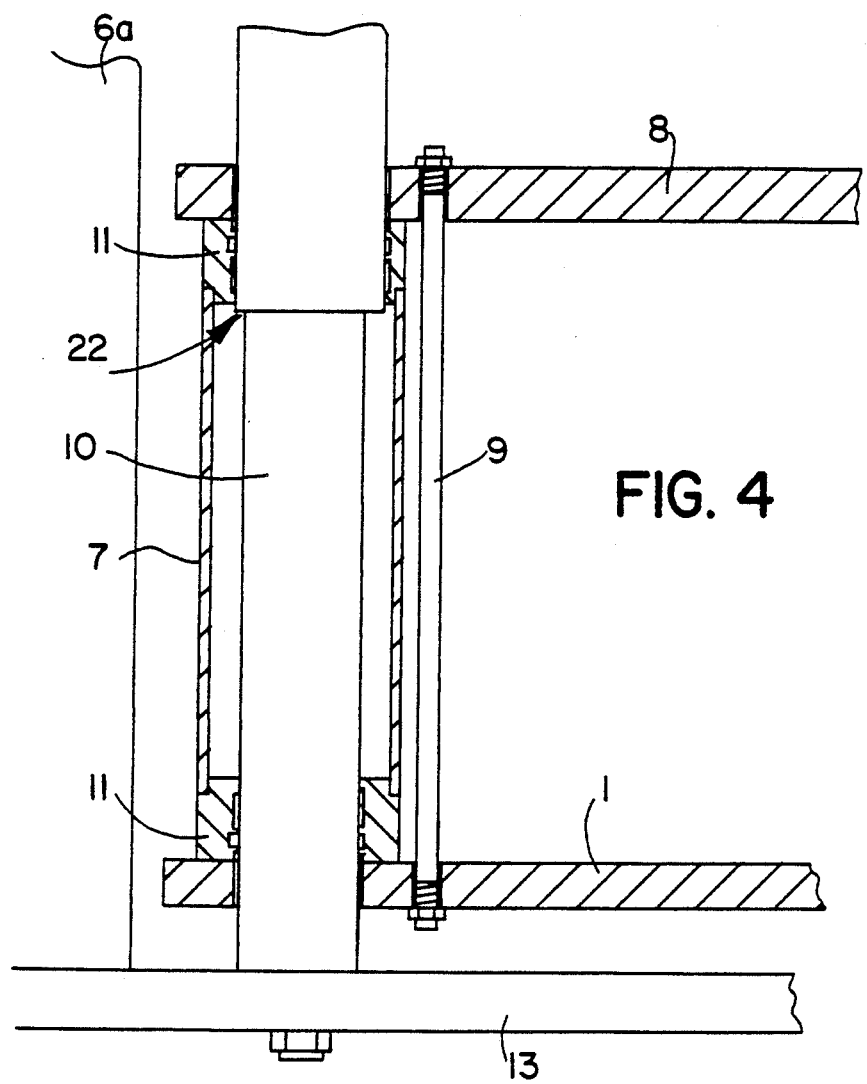
FIG. 4 is a fragmentary part-sectional view taken along line IV—IV of FIG. 3 and to a different scale.

The members for guiding said unit consist of two vertical sleeves 7 which are fixed on the table 1 at their lower ends and on each side of the intended location of the workpiece 2. The upper ends of these two sleeves are connected to each other by means of a horizontal cross-member 8. These various components can be rigidly assembled together by means of a series of vertical tie-bolts 9 as shown in FIG. 4.

Guiding of the moving unit 6 by the vertical sleeves 7 is carried out through the intermediary of two vertical columns 10 which form part of said unit and are slidably mounted within bearings 11 provided at both ends of said sleeves. The upper and lower ends of said columns are fixed on two horizontal cross-members 12 and 13 located in one case at the top and in the other case at the bottom. These two cross-members connect together the two lateral portions 6a and 6b of said moving unit which serve as supports respectively for the driving wheel 14a and for the guide wheel 14b of the saw-blade 15. Thus the moving unit 6 is provided with a closed frame. It is worthy of note that the lower horizontal cross-member 13 of said frame is located beneath the work table 1 (as shown in FIGS. 1 and 4).

The two wheels 14a and 14b are located in the same vertical plane and are mounted so as to be capable of rotating about two horizontal axes 16a and 16b. The driving wheel is driven by a motor 17. In regard to the guide wheel, the bearings of its rotating shaft are mounted on horizontal guides and a jack 18 is provided for applying the required tension to the saw-blade.

In accordance with another distinctive feature of the band-saw, the arrangement is such that the upper horizontal run 19 of the saw-blade constitutes the work run of this latter. To this end, provision is made on each side of the work zone of said run for guides 20 which are capable of raising the corresponding zone of this latter to a vertical position. On the other hand the lower run 21 of the saw-blade extends in a flat position beneath the work table 1 so as to constitute the return run of said saw-blade.

By means of this arrangement, the moving work unit 6 is located at a much lower level than in prior art band-saws of conventional design. Under these conditions, the zones for guiding said moving unit within the bearings of the vertical sleeves 7 are themselves located approximately at the level of the work run 19 of the saw-blade, which constitutes an optimum solution from a mechanical point of view.

In the highest starting position of the moving work unit 6 as shown in full lines in FIG. 1, the lower cross-member 13 is located immediately beneath the plate 1 of the work table. In this case the upper cross-member 12 is located at a distance H above the cross-member 8 which connects the two vertical guide sleeves 7. This distance H corresponds to the range of travel of the moving work unit during operation of the band-saw under consideration, the bottom positions 12a and 13a of the cross-members 12 and 13 being shown in chain-dotted lines in FIG. 1.

As shown in FIG. 4, the vertical columns 10 forming part of the moving unit 6 advantageously comprise an annular shoulder 22 in those portions which are always located inside the guide sleeves 7. These latter can thus serve as hydraulic jacks for lifting the moving unit 6 after completion of its movement of downward travel, the corresponding portions of the columns 10 being intended to perform the function of pistons. To this end, the sleeves 7 are filled with oil and connected by means of a suitable circulation system to a discharge pump which controls the lifting action. This circulation system includes a flow-limiting valve (not shown) for controlling the movement of downward travel of the moving unit while a sawing operation is in progress. It will be understood that this circulation system can also be connected to safety devices such as those described in the two French patent Applications No. 83.19832 and No. 87.14438.

Thus the guide sleeves 7 and the corresponding vertical columns 10 constitute two hydraulic jacks for the upward displacement of the moving work unit and for braking its movement of downward travel. This corresponds to a balanced assembly which completely frees the space provided for parts to be sawn since these two jacks are placed on both sides. In addition, these two jacks are realized in a practically gratuitous manner since they are constituted by the guiding elements of the moving unit. Moreover, this solution has the further advantage of ensuring automatic lubrication of the vertical columns 10 with the oil contained within the guide sleeves 7.

Figure 2:
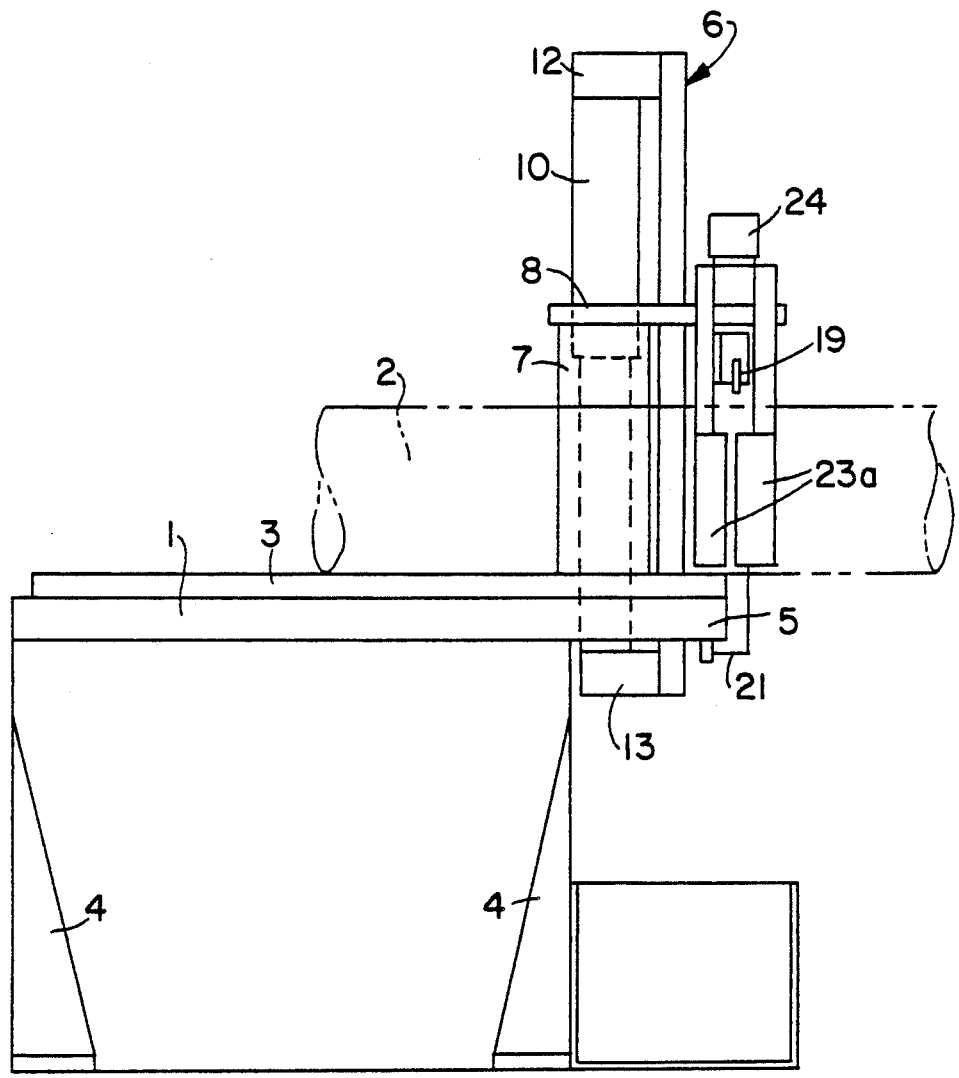
FIG. 2 is a view in side elevation of the band-saw.
Figure 3:
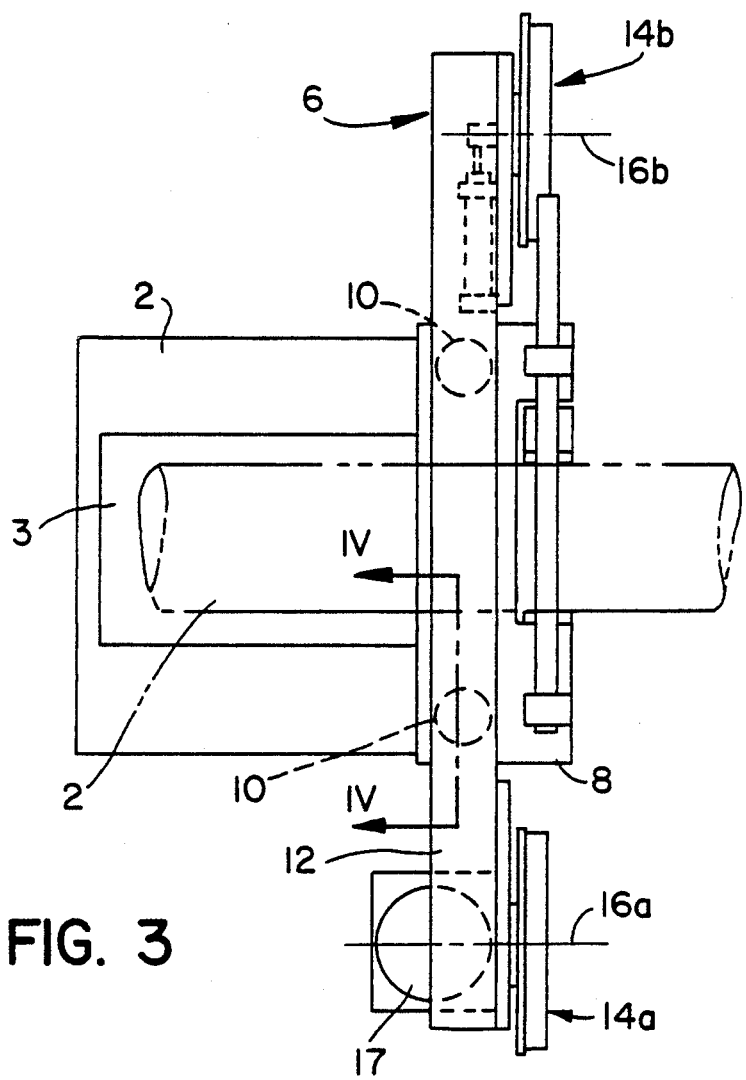
FIG. 3 is a top plan view of the band-saw.

As is apparent from FIGS. 1 and 2, the horizontal cross-member 8 which connects the upper ends of the two sleeves 7 is constituted by a plate which serves as a support for the upper ends of the jaws 23a and 23b of the vise used for clamping the workpiece 2 in position whilst the lower ends of said jaws are free. This corresponds to a reversal of the usual mode of assembly of such jaws on a horizontal band-saw. The jaws 23a located on one side can be fixed whilst the jaws 23b on the opposite side are slidably mounted in the transverse direction so as to be actuated by a jack 24 which makes it possible to apply them against the workpiece.

The advantage of reversal of the mode of assembly of the vise jaws lies in the fact that the adjustment guides work in a cleaner environment since they are no longer located in the swarf and cutting lubricant. Moreover, these guides can have a greater length, thus permitting better guiding action. Furthermore, the working play of the vise thus has a tendency to apply the workpiece 2 on the work table 1 and not to lift it as is the case in machines of conventional design.

However, the main advantage of the band-saw in accordance with the invention lies in the fact that the frame of its moving work unit 6 is a closed frame provided with top and bottom cross-members. Thus the frame is not liable to develop deformation and is capable of withstanding the high stresses to which it is subjected and which arise from the tension of the saw-blade. In consequence, this frame can be of much lighter construction than in machines of conventional design. In addition, since the fixed guiding members carried by the work table, namely the vertical sleeves 7, are no longer subjected to stresses originating from the frame of the moving work unit, these guiding members can themselves be of much lighter construction and the same applies to the elements used for fixing them on the work table. In consequence, the general result thereby achieved is to permit a much lighter construction of the band-saw and therefore a reduction of its cost with respect to machines of conventional design.

Figure 5:
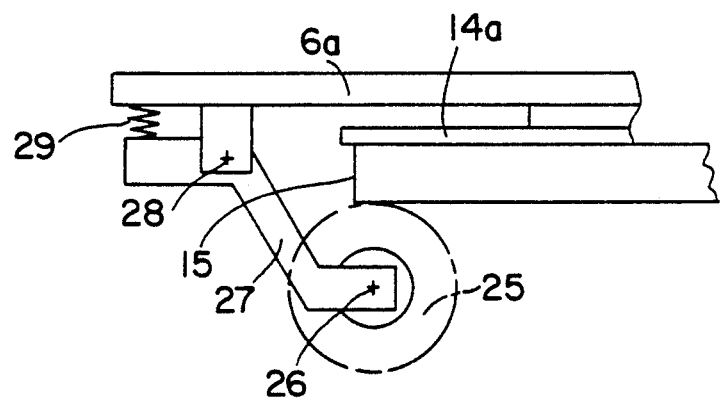
FIG. 5 is a top plan view of a particular detail of the band-saw.

In accordance with another improvement of the present band-saw, the circular wire brush 25 provided in this latter for cleaning the teeth of the saw-blade 15 as they pass out of the cutting zone is mounted so as to obtain automatic compensation for wear of said brush. To this end, the brush spindle 26 is carried by an elbowed arm 27 mounted on a pivot-pin 28 and subjected to the pressure of a spring 29 which tends to maintain said brush under pressure against the toothed edge of the saw-blade 15. However, it would be possible to provide a balance-weight instead of a restoring spring. In the example shown in FIG. 5, the brush 25 is thus maintained applied against the front face of the driving wheel 14a. However, said brush could be placed at any other point of the saw-blade path. Furthermore, a warning lamp could be provided for indicating complete wear of the brush 25 with a view to replacing this latter.

However, many other modifications may be contemplated for the band-saw in accordance with the invention.

What is claimed is:

1. A horizontal band-saw comprising a workpiece-supporting table, a work unit mounted for vertical movement relative to the table, said unit having two lateral portions located on opposite horizontal sides of said table each said portion serving as a support for a respective vertical wheel for driving and guiding an endless saw blade that passes about said wheels, the saw blade having two horizontal runs that extend between said wheels respectively above and below said table, two vertical sleeves fixed to said table, and two vertical columns each of which is slidable vertically in a respective one of said sleeves, said vertical columns having upper and lower ends, said lower ends of said vertical columns being secured to a horizontal crosspiece that interconnects said two portions at the bottom of said unit and said upper ends of said columns being secured to a horizontal crosspiece which interconnects said portions at the top of said unit.

2. A band-saw as claimed in claim 1, said vertical guide sleeves having upper and lower ends, said lower ends of said guide sleeves being secured to said table and said upper ends of said sleeves being secured to a horizontal cross member whereby said table and horizontal cross member and vertical guide sleeves form a closed frame adapted to receive within it a said workpiece.

3. A band-saw as claimed in claim 2, said horizontal cross member which interconnects the upper ends of the vertical guide sleeves supporting upper ends of jaws of a vise for clamping a said workpiece in position, said jaws extending downwardly from said horizontal cross member and terminating in free lower ends.

4. A band-saw as claimed in claim 1, said vertical columns sealingly sliding in said sleeves and the diameter of upper portions of said columns within said sleeves being greater than the diameter of lower portions of said columns within said sleeves, and means for supplying hydraulic fluid under pressure to the interior of said sleeves to raise said columns relative to said sleeves.

5. A band-saw as claimed in claim 1, and a brush engageable with the saw blade to remove swarf from the saw blade, said brush being carried by a support pivotally mounted on a fixed pin, and a restoring member which acts on the brush to urge the brush toward the saw blade to compensate for wear of the brush.

* * * * *